United States Patent
Probst et al.

(10) Patent No.: US 6,583,215 B2
(45) Date of Patent: Jun. 24, 2003

(54) AQUEOUS 2-COMPONENT PU SYSTEMS

(75) Inventors: Joachim Probst, Leverkusen (DE); Erhard Lühmann, Leverkusen (DE); Horst Clemens, Krefeld (DE); Wolfgang Kremer, Kerken (DE); Jürgen Meixner, Krefeld (DE); Hans-Josef Laas, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/944,447

(22) Filed: Aug. 30, 2001

(65) Prior Publication Data

US 2002/0143101 A1 Oct. 3, 2002

(30) Foreign Application Priority Data

Sep. 4, 2000 (DE) .......................... 100 43 433

(51) Int. Cl.⁷ .............................. C08J 3/00; C08K 3/20; C08L 75/00; C08F 8/30; C08F 283/04
(52) U.S. Cl. ................. 524/589; 427/372.2; 427/385.5; 428/423.1; 524/507; 524/590; 524/591; 524/839; 524/840; 525/123; 525/127; 525/455
(58) Field of Search ................ 524/507, 591, 524/839, 840, 589, 590; 525/123, 455, 127; 428/423.1; 427/385.5, 372.2

(56) References Cited

U.S. PATENT DOCUMENTS

| | | | |
|---|---|---|---|
| 3,124,605 A | 3/1964 | Wagner | 260/453 |
| 3,358,010 A | 12/1967 | Britain | 260/453 |
| 3,903,126 A | 9/1975 | Woerner et al. | 260/453 |
| 3,976,622 A | 8/1976 | Wagner et al. | 260/77.5 AT |
| 4,324,879 A | 4/1982 | Bock et al. | 528/45 |
| 4,496,624 A * | 1/1985 | McCartney | |
| 4,701,480 A * | 10/1987 | Markusch et al. | |
| 5,075,370 A | 12/1991 | Kubitza et al. | 524/591 |
| 5,252,696 A | 10/1993 | Laas et al. | 528/49 |
| 5,304,400 A | 4/1994 | Dhein et al. | 427/388.4 |
| 5,473,011 A | 12/1995 | Laas et al. | 524/840 |
| 5,723,518 A | 3/1998 | Kahl et al. | 523/324 |
| 6,217,941 B1 | 4/2001 | Bernard et al. | 427/358 |
| 6,309,707 B1 | 10/2001 | Mayer et al. | 427/386 |

FOREIGN PATENT DOCUMENTS

| | | |
|---|---|---|
| CA | 2090144 | 8/1993 |
| CA | 2272361 | 11/1999 |
| WO | 98/38231 | 9/1998 |
| WO | 00/39228 | 7/2000 |

* cited by examiner

*Primary Examiner*—Patrick D. Niland
(74) *Attorney, Agent, or Firm*—Joseph C. Gil; John E. Mrozinski, Jr.; Thomas W. Roy

(57) ABSTRACT

The invention relates to an aqueous 2-component polyurethane (PU) coating composition comprising a vinyl polymer polyol dispersion, having a hydroxyl number between 10 and 264 mg KOH/g solid resin, an acid value (calculated from the sum of neutralized and non-neutralized acid groups) between 0 and 55 mg KOH/g solid resin, a number-average molecular weight $M_n$ of at least 5000 g/mol and a weight average molecular weight $M_w$ of at least 30,000 g/mol, a glass transition temperature of at least 20° C. and an average particle diameter of no greater than 300 nm, which is prepared in the presence of 0.1 to 10.0 wt. %, relative to the sum of the solids contents of polymer polyol and polyisocyanate, of a non-ionic polyether surfactant and a polyisocyanate having a viscosity at 23° C. of no more than 12,000 mPa*s and either a non-hydrophilic or a non-ionically or anionically hydrophilic character, whereby the equivalent ratio of isocyanate groups of component b) to hydroxyl groups of component a) is 0.2:1 to 5:1; a process for the preparation of such aqueous 2-component coating compositions, and their use as 2-component PU paints for painting any type of substrate.

18 Claims, No Drawings

AQUEOUS 2-COMPONENT PU SYSTEMS

FIELD OF THE INVENTION

The invention relates to aqueous 2-component polyurethane (PU) coating compositions containing specially modified vinyl polymer polyol dispersions and polyisocyanates, a process for the preparation of such aqueous 2-component PU systems with improved stability in respect of aqueous chemicals, and their use as 2-component PU paints for painting any type of substrate, e.g. wood, metal, plastic.

BACKGROUND OF THE INVENTION

EP-A 0 358 979, EP-A 0 496 210 and EP-A 0 557 844 and other patent literature describe the preparation of aqueous 2-component PU dispersions in which both so-called secondary dispersions and so-called primary dispersions as polyol components are used with suitable polyisocyanates. The term "secondary dispersions" refers to such aqueous dispersions which are first polymerized in the homogeneous organic medium and then redispersed in the aqueous medium with neutralization, generally without the addition of external emulsifiers.

The term "primary dispersions" refers to polyol dispersions that are prepared directly in the aqueous phase by the method of emulsion polymerization. They generally contain external emulsifiers for electrostatic or steric stabilization.

Because of their relatively low molecular weights, $M_n$ generally below 5000 g/mol and $M_w$ generally below 30,000 g/mol, and by reason of their balanced hydrophilic/lipophilic character, the secondary dispersions are extremely suitable for effecting a stable emulsification of both hydrophilic and hydrophobic non-self dispersing polyisocyanates in an aqueous environment and at the same time for acting as reactive components (cf. EP-A 0 358 979). The relatively low molecular weights of the secondary polyol dispersions means that such aqueous 2-component PU systems are generally not sufficiently suitable, however, in terms of their physical surface drying on wood as a substrate. The drying times (touch and dust drying) are too long and are unsuitable for industrial painting.

Examples containing primary dispersions as polyol components are generally more suitable as physically quick drying aqueous 2-component PU systems. These generally display molecular weight values of $M_n$ significantly higher than 5000 g/mol and $M_w$ values of generally above 30,000 g/mol. These primary dispersions can generally only be combined with (partially) hydrophilically modified polyisocyanates; a relatively uncomplicated dispersion can be performed with reasonably simple mixing equipment or by hand with a glass rod (as described in EP-A 0 557 844). If, for example, polyisocyanates hydrophilcally modified with polyether groups are then used as crosslinking agents and such coatings are applied to wood as a substrate, then paint films are obtained after drying which retain lasting discoloration under the action of color-imparting substances such as e.g. red wine, coffee, tea, mustard, etc., which on furniture in particular can lead to permanent staining. Such coating systems also display slight haze. If, alternatively, polyisocyanates containing external or internal anionic groups are used, the stain resistance improves but the level of resistance is still not satisfactory. Moreover, the mutual compatibility of the components in such systems deteriorates, and the films exhibit increased haze.

SUMMARY OF THE INVENTION

It was an object of the present invention to provide polyol dispersions as components for 2-component PU systems which form stain-resistant, haze-free coating films with polyisocyanate components containing anionic groups.

This object could be achieved by combining aqueous polyol dispersions, preferably of the primary dispersion type produced in the presence of special non-ionic surfactants, with polyisocyanates displaying both a hydrophobic character and a non-ionically or anionically modified hydrophilic character. This fact was all the more surprising because, as has already been mentioned above, polyol dispersions without such special non-ionic surfactants in combination with non-ionically modified hydrophilic polyisocyanates lead to paints with unsatisfactory stability values in respect of aqueous color-imparting liquids, and further addition of non-ionic surfactants to the 2-component PU system would have been expected to result in a further marked deterioration in resistance values.

DETAILED DESCRIPTION OF THE INVENTION

The invention relates to an aqueous 2-component polyurethane (PU) coating composition containing a) a vinyl polymer polyol dispersion, having a hydroxyl value between 10 and 264 mg KOH/g solid resin, an acid value (calculated from the sum of neutralized and non-neutralized acid groups) between 0 and 55 mg KOH/g solid resin, a number-average molecular weight $M_n$ of at least 5000 g/mol and a weight average molecular weight $M_w$ of at least 30,000 g/mol, a glass transition temperature of at least 20° C. and an average particle diameter of no greater than 300 nm, which is prepared in the presence of
   a1) 0.1 to 10.0 wt. %, relative to the sum of the solids contents of polymer polyol and polyisocyanate, of a non-ionic polyether surfactant, and b) a polyisocyanate having a viscosity at 23° C. of no more than 12,000 mPa*s and either a non-hydrophilic or a non-ionically or anionically hydrophilic character, and whereby the equivalent ratio of isocyanate groups of component b) to hydroxyl groups of component a) is 0.2:1 to 5:1.

The invention also relates to a process for the preparation of such aqueous 2-component PU systems.

Component a) is preferably produced in the presence of a1) 1.0 to 8.0 wt. % of the polyether-type non-ionic surfactant. Block polymers of ethylene oxide and propylene oxide according to formula (I)

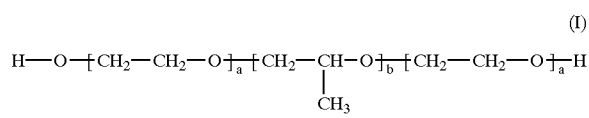

and/or block and random ethylene oxide/propylene oxide copolymers based on fatty alcohols (II), and/or block polymers of the type according to formula (III), which can be obtained by polycondensation of propylene oxide and ethylene oxide on ethylene diamine,

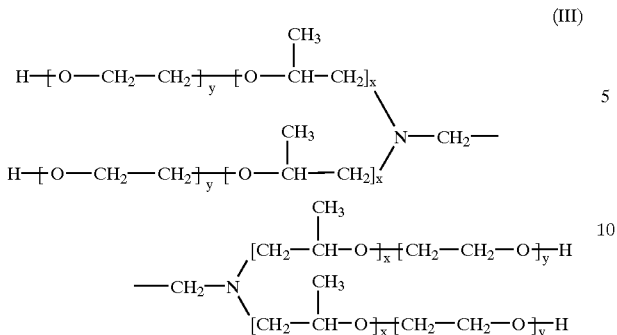

(III)

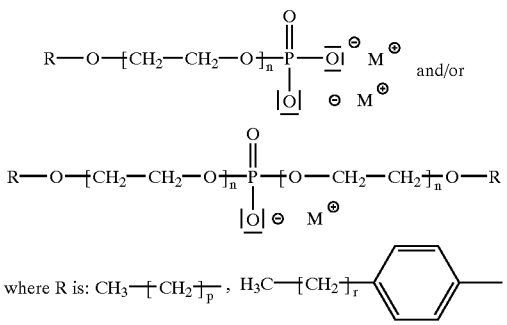

where R is: $CH_3\text{-}(CH_2)_p\text{-}$, $H_3C\text{-}(CH_2)_r\text{-}\langle\text{phenyl}\rangle\text{-}$ n = 1–100; p = 5–20; r = 5–15; M = alkali-or (substituted) ammonium ion and/or adducts of polyethylene oxide on fatty alcohols (IV) and/or polyether/polyester block polymers (V), are preferably produced or used as surfactant components a1).

Surfactant classes (I), (II), (III) and (IV) are particularly preferred as surfactant components a1). These non-ionic surfactants generally display a polyethylene oxide content of 5 to 80 wt. %, molecular weights up to 10,000 g/mol and hydroxyl contents of between 0.3 and 8.0 wt. %.

Component a) is produced in such a way that the non-ionic surfactant a1) is added either before or during polymerization. The introduction of a1) into the polymer batch prior to the production of a) is preferred.

The polyisocyanate component b) can display either b1) a non-hydrophilic character or b2) a non-ionically modified hydrophilic character and/or alternatively b3) an anionically modified hydrophilic character.

If a non-hydrophilic polyisocyanate component b1) that is insoluble or non-dispersible in water is used in the aqueous 2-component PU system, a good dispersing effect can only be achieved using a highly efficient dispersing unit, e.g. a jet dispersing unit according to EP-A 0 685 544. Only in this way can the maximum possible chemical resistance values of the 2-component PU system be achieved after application of the film.

If, however, the polyisocyanate component b) is to be dispersed with the polyol component effectively and in a fine-particle manner using simpler dispersing units, such as e.g. an agitator, or using a 2-component plant with pre-atomising nozzle or possibly even manually, a non-ionic or an anionic hydrophilization of b) (as component b2) or b3)) is absolutely essential.

The non-ionic hydrophilisation of the polyisocyanate component b) is generally performed by modifying an unmodified hydrophobic polyisocyanate with a polyether monoalcohol, e.g. according to EP-A 0 540 985 and EP-A 0 959 087.

The anionic hydrophilization of component b) is preferably performed by adding 0.2 to 5.0 wt. % (relative to the sum of the solids contents of polymer polyol and polyisocyanate) of surfactants containing sulfate, sulfonate or phosphate groups to the unmodified, hydrophobic polyisocyanate component b). The particularly preferred, phosphate group-containing surfactants exhibit the following structures:

Although the sole use of phosphate-containing surfactants having the above structure in aqueous 2-component PU systems is already known (e.g. WO 98/38196 and WO 98/38231), mixing the polyisocyanate component b) with the polyol component a), which has not been prepared in the presence of the non-ionic surfactant component a1), leads to unusable results: the polyisocyanates b) are substantially more difficult to incorporate into the polyol a), resulting in relatively unstable 2-component dispersions, and the dry paint films are significantly hazier. As demonstrated in the examples; the stability of the dry 2-component film on wood as; a substrate, for example, with respect to aqueous chemicals such as e.g. color-imparting substances (red wine, coffee, tea and mustard) is also significantly reduced.

The anionic hydrophilization of component b) can also be performed by means of sulfate or sulfonate groups as an alternative to phosphate groups. The use of sulfonate groups, which are present in the polyisocyanate in chemically bonded form, is preferred here. These can be produced for example by reacting polyisocyanates with sulfonate group-containing surfactants, which additionally also carry at least one group that is reactive in respect of NCO groups. Reaction products of polyisocyanates with 3-(cyclohexylamino)propane sulfonic acid are an example. The sulfonate groups can be present in quantities of 0.1 to 5.0 wt. % relative to the polyisocyanate.

The use of mixed hydrophilically modified polyisocyanates, such as described e.g. in EP-A 0 510 438, is also possible in principle. This involves simultaneous hydrophilization with non-ionic polyether groups and (potentially) anionic carboxyl groups.

The polymers a) are hydroxy-functional copolymers in the hydroxyl value range from 10 to 264 mg KOH/g solid resin, the acid value range from 0 to 55 mg KOH/g solid resin, which also display a content of chemically bonded carboxylate and/or sulfonate groups of a total of 0 to 97 milliequivalents (meq) per 100 g solids. The acid value refers here both to the free, unneutralized acid groups, particularly carboxyl groups, and the acid groups present in neutralized form, particularly carboxylate groups. The copolymers generally exhibit a molecular weight $M_n$ of 5000 to 300,000, preferably 10,000 to 200,000, and a molecular weight $M_w$ of 30,000 to 2,000,000, preferably 40,000 to 500,000 g/mol, determined by the method of gel permeation chromatography using polystyrene as standard.

The copolymers a) preferably contain

A) 0 to 7, preferably 1 to 5 wt. % acrylic acid and/or methacrylic acid,

B) 0 to 75 wt. % methyl methacrylate,

C) 0 to 75 wt. % styrene, whereby the sum of B+C is 10 to 85 wt. %.

D) 3 to 40 wt. % of one or more $C_{1-8}$ alkyl acrylates or $C_{2-8}$ alkyl methacrylates, E) 2 to 74 wt. % of one or more monohydroxy-functional alkyl acrylates or alkyl methacrylates F) 0 to 15 wt. % of other olefinically unsaturated monomers, whereby the sum of A) to F) is 100 wt. %, whereby moreover 5 to 100% of the acid groups incorporated by polymerization have been neutralized with aliphatic, amines or with ammonia, such that the content of anionic, salt-like groups in the copolymers corresponds to the figures given above.

The unsaturated acids A) and optionally F) incorporated by polymerization are, as stated, at least partially neutralized, such that the resulting anionic groups ensure or at least facilitate the solubility or dispersibility of the copolymers in water. If only low concentrations of salt-like groups are present, the solubility or dispersibility of the copolymers in water can be improved by the use of external emulsifiers. In all cases the water dilutability of the copolymers either as a dispersion or as a colloidally to molecularly disperse "solution" must be assured.

The monomers B) and C) can be varied such that 10 to 85 wt. % of exclusively one of the monomers is contained in the sum of B)+C), whereby styrene is preferred.

Examples of $C_{1-8}$ alkyl acrylates D) include methyl acrylate, ethyl acrylate, n-propyl acrylate, iso-propyl acrylate, n-butyl acrylate, iso-butyl acrylate, n-hexyl acrylate, n-octyl acrylate, 2-ethylhexyl acrylate. n-butyl acrylate., n-hexyl acrylate, 2-ethylhexyl acrylate, particularly n-butyl and/or 2-ethylhexyl acrylate, are preferred.

Examples of $C_{2-8}$ alkyl methacrylates D) include ethyl methacrylate, n-butyl methacrylate and/or 2-ethylhexyl methacrylate.

Examples of hydroxy-functional (meth)acrylates E) include 2-hydroxyethyl (meth)acrylate, 2-hydroxypropyl (meth)acrylate, 2-hydroxyisopropyl (meth)acrylate, 4-hydroxybutyl (meth)acrylate or any combinations of these monomers. 2-hydroxyethyl methacrylate and the technical blend of 2-hydroxypropyl and 2-hydroxyisopropyl methacrylate, generally known as hydroxypropyl methacrylate, are preferred.

The further monomer units F) can be substituted styrene derivatives, such as e.g. the isomeric vinyl toluenes, α-methyl styrene, propenyl benzene, $C_5$–$C_{12}$ cycloalkyl (meth)acrylates, isobornyl (meth)acrylate, vinyl esters such as vinyl acetate, propionate or versatate, vinyl sulfonic acid, whereby the total amount of polymerizable acids (carboxylic acids A) plus optionally the acids cited under F) does not exceed 7 wt. %.

Ammonia or aliphatic amines such as e.g. triethylamine, dimethyl ethanolamine, diethyl ethanolamine, triethanolamine or any other aliphatic amines, preferably from the molecular weight range 31 to 200, can be used for the at least partial neutralization of the acid groups incorporated by polymerization.

The copolymers a) can be prepared by solution polymerization in organic solvents. Examples of suitable solvents include toluene, xylene, technical blends of alkyl aromatics (Solvesso 100, Solvesso 150, etc.), chlorobenzene, ethyl or butyl acetate, methyl or ethyl glycol acetate, methoxypropyl acetate, methoxybutyl acetate, butyl glycol, dioxan, ethylene glycol monoethyl or diethyl ether, dipropylene glycol dimethyl ether, acetone, butanone, methylene chloride or any mixtures of such solvents.

If the copolymers a) are prepared in solution, such solvents are generally used in such low concentrations that they do not need to be removed after polymerization and conversion to the aqueous phase.

Examples of suitable polymerization initiators for this radical solution polymerization include aliphatic azo compounds such as azoisobutyronitrile (AIBN) or peroxidic compounds, such as benzoyl peroxide, tert.-butyl peroctoate, tert.-butyl perpivalate, tert.-butyl perbenzoate or di-tert.-butyl peroxide.

Examples of molecular weight regulators include above all sulfur compounds, such as e.g. dodecyl mercaptan (dodecanethiol) or thioglycol.

On completion of polymerization, the solutions or dispersions a) are preferably prepared by adding neutralization amine directly to the organic polymer solution and then introducing it into the aqueous phase or by metering the organic polymer solution into the water phase, to which neutralization agent has been added, and homogenizing it. The organic solvent present during polymerization can then be partially or completely removed by distillation if necessary.

Production of the copolymers a) directly in the aqueous dispersion by the emulsion polymerization method is particularly advantageous, however. Peroxodisulfates, e.g. potassium or ammonium peroxodisulfate, are particularly suitable here as radical initiators. If the copolymers a) are produced by the principle of emulsion polymerization, external emulsifiers such as anionic emulsifiers, for example, such as those based on alkyl sulfates, alkylaryl sulfonates, alkylphenol polyether sulfates as specified in Houben-Weyl, Methoden der organischen Chemie, Erweiterungs- und Folgebände, 4$^{th}$ edition, volume E 20, 1987 (part 1, pages 259 to 262), for example, or alkyl polyether sulfates, or non-ionic emulsifiers such as e.g. the alkoxylation and particularly the ethoxylation products of alkanols, phenols or fatty acids, can be used, which remain in the system following production of the copolymers and can be regarded as auxiliary substances c). Where such emulsifiers are present, a very slight neutralization of the acid groups present is often sufficient to ensure the homogeneity of the solutions or dispersions a). The neutralizing agents, which are nevertheless used at least in small quantities, can be incorporated into the system as early as the emulsion polymerization stage. These dispersions generally exhibit solids contents of 20 to 60 wt. %, a pH from 6 to 10, a viscosity from 10 to 5000 mPas and an average particle diameter from 50 to 300 nm (measured using laser correlation spectroscopy). The glass transition temperatures (measured by means of DSC) of the solid resins are above 20° C., preferably above 40° C.

Polyisocyanates suitable as component b) are in particular the so-called "lacquer polyisocyanates" with aromatically or (cyclo)aliphatically bonded isocyanate groups, whereby (cyclo)aliphatic polyisocyanates are particularly preferred.

"Lacquer polyisocyanates" based on hexamethylene diisocyanate or 1-isocyanato-3,3,5-trimethyl-5-isocyanatomethyl cyclohexane (IPDI) and/or bis (isocyanatocyclohexyl)methane, for example, are very suitable, particularly those based exclusively on hexamethylene diisocyanate. "Lacquer polyisocyanates" based on these diisocyanates are to be interpreted as the known derivatives of these diisocyanates containing biuret, urethane, uretdione, allophanate and/or isocyanurate groups, which after production have been freed from excess starting diisocyanate down to a residual content of less than 0.5 wt. % by known means, preferably by distillation. The preferred aliphatic polyisocyanates for use according to the invention include the hexamethylene diisocyanate-based polyisocyanates displaying biuret groups in accordance with the above criteria, such as can be obtained for example by the methods described in U.S. Pat. Nos. 3,124,605, 3,358,010, 3,903,126, 3,903,127 or 3,976,622 and consist of mixtures of N,N',N"-tris-(6-isocyanatohexyl) biuret with secondary quantities of its higher homologues, as well as the cyclic trimers of hexamethylene diisocyanate corresponding to the stated criteria, such as can be obtained according to U.S. Pat. No. 4,324,879, and which consist substantially of N,N',N"-tris-(6-isocyanatohexyl) isocyanurate mixed with secondary quantities of its higher homologues. Mixtures of hexamethylene diisocyanate-based polyisocyanates according to the stated criteria displaying uretdione and/or isocyanurate groups, such as are formed by catalytic oligomerisation of hexamethylene diisocyanate with the aid of trialkyl phosphines, are particularly preferred. The latter mixtures having a viscosity at 23° C. of 50 to 500 mPas and an NCO functionality of between 2.2 and 5.0 are especially preferred. Monomeric polyisocyanates such as e.g. 4-isocyanatomethyl-1,8-octane diisocyanate can also be used, however.

The aromatic polyisocyanates, which are likewise suitable according to the invention but are less preferred, are particularly "lacquer polyisocyanates" based on 2,4-diisocyanatotoluene or technical blends thereof with 2,6-diisocyanatotoluene or based on 4,4'-diisocyanatodiphenyl methane or mixtures thereof with their isomers and/or higher homologues. Such aromatic lacquer polyisocyanates are for example the urethane group-displaying isocyanates such as are obtained by reacting excess quantities of 2,4-diisocyanatotoluene with polyhydric alcohols such as trimethylol propane, followed by removal of the excess of non-reacted diisocyanate by distillation. Further aromatic lacquer polyisocyanates include for example the trimers of the monomeric diisocyanates cited by way of example, i.e. the corresponding isocyanato-isocyanurates, which have likewise been freed from excess monomeric diisocyanates after production, preferably by distillation.

Unmodified polyisocyanates of the type mentioned by way of example can also be used in principle, provided that they correspond to the statements made in respect of viscosity.

The preferred use of hydrophilically modified polyisocyanates b) prepared by non-ionic or anionic hydrophilization of the above hydrophobic polyisocyanates is described above.

The polyisocyanate component b) can also consist of any mixture of the polyisocyanates cited by way of example.

The 2-component PU blends for use according to the invention are generally prepared by simply stirring the individual components a) and b) manually or by means of stirrers or in the case of poorly dispersible 2-component systems using a jet disperser, whereby NCO/OH equivalent ratios of 0.2:1 to 5:1, preferably 0.7:1 to 3:1, are obtained.

The non-ionic surfactant component a1) can in principle be added prior to or during polymerization of a). In the case of emulsion polymerization, if component a1) of the polyol component a) is incorporated prior to polymerization, it is added to the aqueous batch, generally together with an anionic emulsifier.

If component a1) is added during feed polymerization, it is generally added to the flow of monomer blend or, if it is sufficiently dispersible in water, to the aqueous flow of initiator solution. Surfactant component a1) can in principle also be added to the polyol component a) on completion of polymerization.

The compatibility between the polyisocyanate component b) and the polyol component a) and hence also the easier dispersibility of the aqueous 2-component PU system produced from these components is considerably increased if the polyisocyanate component has been hydrophilically modified either non-ionically or anionically. In some cases dispersion can then be performed by hand or using simple stirring devices such as e.g. an agitator.

Further auxiliary substances and additives c) known from paint technology can optionally be incorporated into the mixtures containing a) and b) for use according to the invention or into the individual components used in their production.

These include, for example, further quantities of water and/or solvent for the purpose of adjusting the appropriate processing viscosity of the coating compound according to the invention. The ready-to-use coating compounds according to the invention generally contain, relative to the total weight of all components, 2 to 25 wt. % of organic solvents and 10 to 75 wt. % of water. Further auxiliary substances and additives c) include, for example, pigments, fillers, flow control agents, thickeners, defoaming agents, deaerating agents and the like.

The coating compounds according to the invention can be applied by all conventional methods used in industry, such as e.g. spraying, immersion or brushing, onto any surface such as e.g. wood, metal, plastic or even mineral surfaces as substrate and dried at room temperature up to approx. 80° C. Application on wood is particularly preferred.

EXAMPLES

Polyisocyanate 1

Desmodur N 100 (Bayer A G, Leverkusen, D E) is a non-hydrophilically modified polyisocyanate based on 1,6-diisocyanatohexane with an NCO content of approx. 22.0%, an average NCO functionality of approx. 3.8, a viscosity of approx. 10,000 mPas (23° C.) and an NCO equivalent weight of approx. 191 g/mol. The following components were incorporated into this polyisocyanate: 7 parts by weight of the emulsifier Rhodafac RE 610 (Rhone Poulenc Chemicals), 1 part by weight of triethylamine and 22 parts by weight of methoxybutyl acetate to 70 parts by weight of the 100% polyisocyanate.

Polyisocyanate 2

850 g (4.39 val) of an isocyanurate group-containing polyisocyanate based on 1,6-diisocyanatohexane (HDI) with an NCO content of 21.7%, an average NCO functionality of 3.5 (by GPC), a content of monomeric HDI of 0.1% and a viscosity of 3000 mPas (23° C.) were prepared at 100° C. under dry nitrogen with stirring, 150 g (0.30 val) of a monofunctional polyethylene oxide polyether initiated on methanol, having an average molecular weight of 500, corresponding to an NCO/OH equivalent ratio of 14.6:1, were added within 30 min and stirring was continued at this temperature until the NCO content of the mixture had fallen to a value of 17.2%, corresponding to complete urethanisation, after approximately 2 hours. The allophanatization reaction was initiated by the addition of 0.01 g zinc(II)-2-ethyl-1-hexanoate. The liberated reaction heat raised the temperature of the reaction mixture to 106° C. Once the exothermic reaction had died down, approx. 30 min after addition of the catalyst, the reaction was terminated by the addition of 0.01 g benzoyl chloride and the reaction mixture was cooled to room temperature. A practically colorless clear polyisocyanate mixture with the following properties was obtained:

| | |
|---|---|
| Solids content: | 100% |
| NCO content: | 16.0% |
| NCO functionality: | 4.0 |
| Viscosity (23° C.): | 3200 mPas |

Polyisocyanate 2 was used as a 70 wt. % solution in methoxybutyl acetate.

Polyisocyanate 3

970 g (5.00 val) of an isocyanurate group-containing polyisocyanate based on 1,6-diisocyanatohexane (HDI) with an NCO content of 21.7%, an average NCO functionality of 3.5 (by GPC), a content of monomeric HDI of 0.1% and a viscosity of 3000 mPas (23° C.) were stirred together with 30 g (0.14 val) of 3-(cyclohexylamino)propane sulfonic acid, 17.4 g (0.14 mol) dimethyl cyclohexylamine and 254 g 1-methoxypropyl-2-acetate under dry nitrogen for 5 hours at 80° C. After cooling to room temperature a practically colorless clear solution of a polyisocyanate mixture according to the invention was obtained with the following properties:

| | |
|---|---|
| Solids content: | 80% |
| NCO content: | 16.0% |
| NCO functionality: | 3.4 |
| Viscosity (23° C.): | 570 mPas |
| Color index: | 15 APHA |
| Sulfonate group content: | 0.9% |

Examples 1–12 are all so-called primary dispersions which—apart from the use according to the invention of the surfactants a1)—were synthesized according to examples 1 and 2 of EP-A 0 557 844.

Polymer Polyol 1 (Primary Dispersion as Comparative Example Without Non-ionic Surfactant)

This vinyl polymer polyol primary dispersion was based on the following comonomer blend:

Acrylic acid (3.0 wt. %), hydroxypropyl methacrylate (16.9 wt. %), methyl methacrylate (50.0 wt. %) and n-butyl acrylate (28.1 wt. %), polymerized in the presence of the emulsifier Agitan 951 (Bayer A G, Leverkusen, D E) (ammonium salt of dodecyl triethylene oxide monosulfate; approx. 2.0 wt. % relative to the monomer blend). The following physico-chemical properties were obtained:

| | |
|---|---|
| Solids content: | 42.0 wt. % |
| pH value: | 7.5 |
| Viscosity (23° C.; D = 42 s$^{-1}$): | 400 mPas |
| Average particle diameter (LCS): | 93 nm |
| Acid value: | 12.4 mg KOH/g dispersion |
| Glass transition temperature T$_g$: | 55° C. |

Polymer Polyol 2 (Comparative Example Analogous to Example 1 with Addition of Non-ionic Surfactant)

The polymer polyol was prepared in the same way as in the example of polymer polyol 1; on completion of polymerization, however, a non-ionic polyethylene oxide/propylene oxide block polymer with a molecular weight of 2090 g/mol and an ethylene oxide content of 10% (Synperonic PE/L 61 (ICI Surfactants); approx. 2 wt. % relative to the dispersion) was added to the prepared dispersion. This dispersion displayed similar physico-chemical properties to polymer polyol 1.

Polymer Polyol 3

Vinyl polymer polyol dispersion based on the following comonomers:

Acrylic acid (3.0 wt. %), hydroxypropyl methacrylate (16.9 wt. %), styrene (68.4 wt. %) and n-butyl acrylate (9.7 wt. %) polymerized in the presence of the same emulsifier (approx. 2.0 wt. % relative to the monomer blend) as in polymer polyol 1 and with the addition of the same polyethylene oxide/polypropylene oxide block polymer as in example 2 (Synperonic PE/L 61 (ICI Surfactants); approx. 2% relative to the dispersion) to the polymer batch. This dispersion displayed the following physico-chemical properties:

| | |
|---|---|
| Solids content: | 43.9 wt. % |
| pH value: | 7.0 |
| Viscosity (23° C.; D = 42 s$^{-1}$): | approx. 80 mPas |
| Average particle diameter (LCS): | 91 nm |
| Acid value: | 12.8 mg KOH/g dispersion |

Polymer Polyol 4 (Primary Dispersion)

Vinyl polymer polyol dispersion based on the same comonomers as in polymer polyol 3; likewise prepared in the presence of the same emulsifier as in polymer polyol 1. During feed polymerization the block polymer Synperonic PE/L 61 (ICI Surfactants; approx. 2% relative to the dispersion) was added to the flow of monomer blend.

The following physico-chemical properties are obtained:

| | |
|---|---|
| Solids content: | 43.6 wt. % |
| pH value: | 7.2 |
| Viscosity (23° C.; D = 42 s$^{-1}$): | 90 mPas |
| Acid value: | 13.9 mg KOH/g dispersion |
| Average particle diameter (LCS): | 102 nm |

Polymer Polyol 5 (Primary Dispersion as Comparative Example For a Polyol with Addition of a Non-ionic Surfactant)

Vinyl polymer polyol dispersion based on the same comonomers as in polymer polyol 3; likewise prepared in the presence of emulsifier 951 (ammonium salt of dodecyl triethylene oxide monosulfate; approx. 2.0 wt. % relative to monomer blend); on completion of polymerization the polyethylene oxide/polypropylene oxide block polymer Synperonic PE/L 61 (approx. 2% relative to dispersion) were added to the dispersion during neutralization with ammonia.

The following physico-chemical properties were obtained:

| | |
|---|---|
| Solids content: | 43.2 wt. % |
| pH value: | 7.5 |
| Viscosity (23° C.; D = 42 s$^{-1}$): | approx. 70 mPas |
| Acid value: | 13.4 mg KOH/g dispersion |
| Average particle diameter (LCS): | 75 nm |
| Molecular weight Mn [g/mol]: | 23300 |
| Molecular weight Mw [g/mol]: | 581000 |
| Glass transition temperature (DSC): | 81° C. |

Polymer Polyol 6

Vinyl polymer polyol dispersion based on the same comonomers as in polymer polyol 3; likewise prepared in the presence of the same emulsifier as in polymer polyol 1. A polyethylene oxide/polypropylene oxide block polymer with a molecular weight of 2200 g/mol and an ethylene oxide content of 40% (Synperonic PE/L 44 (ICI Surfactants); approx. 2% relative to the dispersion) was additionally included in the batch. The aqueous dispersion exhibited the following physico-chemical properties:

| | |
|---|---|
| Solids content: | 43.4 wt. % |
| pH value: | 7.2 |
| Viscosity (23° C.; D = 42 s$^{-1}$): | <100 mPa*s |
| Acid value: | 13.3 mg KOH/g dispersion |
| Average particle diameter (LCS): | 110 nm |

Polymer Polyol 7

Vinyl polymer polyol dispersion according to EP-A 0 358 979 based on the same comonomers as in polymer polyol 3; likewise prepared in the presence of the same emulsifier as in polymer polyol 1. A polyethylene oxide/polypropylene oxide block polymer with a molecular weight of 2900 g/mol and an ethylene oxide content of 40% (Synperonic PE/L 64, ICI Surfactants); approx. 2% relative to the dispersion) was additionally included in the batch. The aqueous dispersion exhibited the following physico-chemical properties:

| | |
|---|---|
| Solids content: | 43.4 wt. % |
| pH value: | 7.1 |
| Viscosity (23° C.; D = 42 s$^{-1}$): | <100 mPa*s |
| Acid value: | 12.9 mg KOH/g dispersion |
| Average particle diameter (LCS): | 125 nm |

Polymer Polyol 8

Vinyl polymer polyol dispersion based on the same comonomers as in polymer polyol 3; likewise prepared in the presence of the same emulsifier as in polymer polyol 1. A polyethylene oxide/polypropylene oxide block polymer with a molecular weight of 3800 g/mol and an ethylene oxide content of 10% (Synperonic PE/L 101 (ICI Surfactants); approx. 2% relative to the dispersion) was additionally included in the batch.

The aqueous dispersion exhibited the following physico-chemical properties:

| | |
|---|---|
| Solids content: | 43.2 wt. % |
| pH value: | 7.0 |
| Viscosity (23° C.; D = 42 s$^{-1}$): | <100 mPa*s |
| Acid value: | 12.8 mg KOH/g dispersion |
| Average particle diameter (LCS): | 93 nm |

Polymer Polyol 9

Vinyl polymer polyol dispersion based on the same comonomers as in polymer polyol 3; likewise prepared in the presence of the same emulsifier as in polymer polyol 1. A polyethylene oxide/polypropylene oxide block polymer with a molecular weight of 4800 g/mol and an ethylene oxide content of 80% (Synperonic PE/F 38 (ICI Surfactants); approx. 2% relative to the dispersion) was additionally included in the batch.

The aqueous dispersion exhibits the following physico-chemical properties:

| | |
|---|---|
| Solids content: | 43.8 wt. % |
| pH value: | 6.7 |
| Viscosity (23° C.; D = 42 s$^{-1}$): | <100 mPa*s |
| Acid value: | 13.0 mg KOH/g dispersion |
| Average particle diameter (LCS): | 133 nm |

Polymer Polyol 10

Vinyl polymer polyol dispersion according to example 3, prepared in the presence of the same emulsifier. An ethylene oxide/propylene oxide block polymer based on ethylene diamine as initiator and displaying a molecular weight of 3700 g/mol and an ethylene oxide content of 10% (Synperonic T/701 (ICI Surfactants); approx. 2% relative to the dispersion) was additionally included in the batch.

The aqueous dispersion exhibits the following physico-chemical properties:

| | |
|---|---|
| Solids content: | 43.6 wt. % |
| pH value: | 7.5 |
| Viscosity (23° C.; D = 42 s$^{-1}$): | <100 mPas |
| Acid value: | 13.8 mg KOH/g dispersion |
| Average particle diameter (LCS): | 105 nm |

Polymer Polyol 11

Vinyl polymer polyol dispersion according to example 3, prepared in the presence of the same emulsifier. A polyether initiated on a fatty alcohol with the approximate molecular weight 630 g/mol (Synperonic LF/RA 30 (ICI Surfactants); approx. 2% relative to the dispersion) was additionally included in the batch.

The aqueous dispersion exhibits the following physico-chemical properties:

| | |
|---|---|
| Solids content: | 44.5 wt. % |
| pH value: | 8.5 |
| Viscosity (23° C.; D = 42 s$^{-1}$): | <100 mPas |
| Acid value: | 14.2 mg KOH/g dispersion |
| Average particle diameter (LCS): | 95 nm |

Polymer Polyol 12

Vinyl polymer polyol dispersion consisting of the same comonomers as in example 1 in the same weight ratios, prepared in the presence of the same emulsifier as in polymer polyol 1. The same non-ionic surfactant as in polymer polyol 2 (Synperonic PE/L61; approx. 2% relative to the dispersion) was additionally included in the batch.

The aqueous dispersion exhibits the following physico-chemical properties:

| | |
|---|---|
| Solids content: | 43.6 wt. % |
| pH value: | 7.5 |
| Viscosity (23° C.; D = 42/s): | 150 mPa*s |
| Acid value: | 14.5 mg KOH/g dispersion |
| Average particle diameter (LCS): | 121 nm |

Application Examples

Examples 1–6

In examples 1 to 6, polymer example 12 and comparative polymer examples 1 and 2 were investigated with regard to the incorporation ability of polyisocyanates 1 and 2.

Pigment pastes were first prepared from these 3 polymer dispersions. To this end Disperbyk 190 and BYK 024 (both from Byk Chemie, Wesel, DE) were first added to the polymer dispersions and Tronox R-KB-2 (Kerr McGee Pigments GmbH, Krefeld, DE) and Aerosil 200 (Grace, DE) were mixed in using an agitator. Dispersion was continued for approx. 15 min at 2000 rpm.

A) Pigment Pastes

|  | Pigment paste 1 | Pigment paste 2 | Pigment paste 3 |
|---|---|---|---|
| Polymer polyol 12 | 208.0 | | |
| Polymer polyol 2 | | 168.0 | |
| Polymer polyol 1 | | | 168.0 |
| Tronox R-KB-2[1] | 200.0 | 200.0 | 200.0 |
| Aerosil 200[2] | 1.0 | 1.0 | 1.0 |
| Disperbyk 190[3] | 8.0 | 8.0 | 8.0 |
| BYK 024[4] | 2.0 | 2.0 | 2.0 |

[1] Tronox R-KB-2: Titanium dioxide pigment (Kerr McGee Pigments, Krefeld)
[2] Aerosil 200: Silicon dioxide as anti-settling agent (Grace)
[3] Disperbyk 190: Wetting and dispersing agent (Byk Chemie, Wesel)
[4] BYK 024: Defoaming agent (BYK Chemie, Wesel)

6 paints were formulated from these pigment pastes according to the table below. These paints were applied to an Erichsen test card in a wet film thickness of approx. 200 μm by means of a box knife and dried for 24 h at 18–24° C. The gloss (angle 60°) was then determined [value 1: black card/value 2: white card].

B) Paint Formulation

| Example | 1 | 2 | 3 | 4 | 5 | 6 |
|---|---|---|---|---|---|---|
| Pigment paste 1 | 42.0 | | | 42.0 | | |
| Pigment paste 2 | | 38.0 | | | 38.0 | |
| Pigment paste 3 | | | 38.0 | | | 38.0 |
| Polymer polyol 12 | 34.0 | | | 34.0 | | |
| Polymer polyol 2 | | 38.0 | | | 38.0 | |
| Polymer polyol 1 | | | 38.0 | | | 38.0 |
| BYK 024 | 1.0 | 1.0 | 1.0 | 1.0 | 1.0 | 1.0 |
| Butyl glycol/water (1:1) | 16.0 | 16.0 | 16.0 | 16.0 | 16.0 | 16.0 |
| Water | 7.0 | 7.0 | 7.0 | 7.0 | 7.0 | 7.0 |
| Polyisocyanate 1 | 10.0 | 10.0 | 10.0 | | | |
| Polyisocyanate 2 | | | | 10.0 | 10.0 | 10.0 |
| Gloss on test card 60° | 69/70 | 62/64 | 62/68 | 49/52 | 36/38 | 36/36 |

Examples 1 and 4 show that the inclusion according to the invention of the non-ionic surfactants in the polyol dispersion significantly improves the incorporation of polyisocyanates and thereby gives rise to a marked improvement in gloss in comparison to the 2-component systems 2, 3, 5 and 6 not prepared according to the invention.

Examples 7–10

In this series of tests polymer example 3 and polymer comparison 5 were tested for chemical resistance according to DIN 68861 in pigmented paint systems. The paints were prepared in the same way as in examples 1–6.

|  | Example 7 | Example 8 | Example 9 | Example 10 |
|---|---|---|---|---|
| Polymer polyol 3 | 56 | | 56 | |
| Polymer polyol 5 | | 56 | | 56 |

-continued

|  | Example 7 | Example 8 | Example 9 | Example 10 |
|---|---|---|---|---|
| Disperbyk 190 | 1.7 | 1.7 | 1.7 | 1.7 |
| Tego Foamex 810[5] | 0.02 | 0.02 | 0.02 | 0.02 |
| Aerosil 200 | 0.1 | 0.1 | 0.1 | 0.1 |
| Tronox R-KB-2 | 14.2 | 14.2 | 14.2 | 14.2 |
| Butyl glycol: water 1:1 | 16 | 16 | 16 | 16 |
| Serad FX 1010 5% in water[6] | 7 | 7 | 7 | 7 |
| BYK 024 | 1 | 1 | 1 | 1 |
| Water | 4 | 4 | 4 | 4 |
| Polyisocyanate 2 | 10 | 10 | | |
| Polyisocyanate 1 | | | 10 | 10 |
| EA/BA 1:1 10 s | 0 | 0 | 0 | 0 |
| Acetone 10 s | 1/1 | 1/1 | 0 | 0 |
| Ammonia 2 min | 0 | 0 | 0 | 0 |
| Soda 2 min | 0 | 0 | 0 | 0 |
| Ethanol 50% 1 h | 0 | 0 | 0 | 0 |
| Water 16 h | 0 | 0 | 0 | 0 |
| Red wine 5 h | 1/1 | 2/2 | 1/0 | 2/1 |
| Mustard 5 h | 1/0 | 3/3 | 1/0 | 2/2 |
| Coffee 16 h | 1/1 | 3/3 | 0 | 3/3 |

[5] Tego Foamex 810: Defoaming agent (Tego Chemie, Essen)
[6] Serad FX 1010: Thickening agent (Servo Delden BV, Delden, Netherlands)

These examples show that by inclusion according to the invention of the non-ionic surfactants, a marked improvement in the chemical resistance values was achieved, particularly in respect of color-imparting liquids (grade 0: highly resistant to chemicals; 5: completely unstable).

Examples 11–17

In this series of tests clear coat systems are prepared from polymer dispersions 3 and 6–11 and tested for gloss formation and chemical resistance to DIN 68861.

| Example | 11 | 12 | 13 | 14 | 15 | 16 | 17 |
|---|---|---|---|---|---|---|---|
| Polymer polyol 6 | 62 | | | | | | |
| Polymer polyol 7 | | 62 | | | | | |
| Polymer polyol 8 | | | 62 | | | | |
| Polymer polyol 9 | | | | 62 | | | |
| Polymer polyol 10 | | | | | 62 | | |
| Polymer polyol 11 | | | | | | 59 | |
| Polymer polyol 3 | | | | | | | 62 |
| BYK 024 | 1 | 1 | 1 | 1 | 1 | 1 | 1 |
| Serad FX 1010, 5% in water | 7 | 7 | 7 | 7 | 7 | 7 | 7 |
| Butyl glycol | 8 | 8 | 8 | 8 | 8 | 8 | 8 |
| Water | 22 | 22 | 21.5 | 22.5 | 22 | 25 | 22.5 |
| Polyisocyanate 2 | 10 | 10 | 10 | 10 | 10 | 10 | 10 |
| Gloss 60° card b/w | 95/99 | 90/96 | 95/99 | 97/100 | 95/97 | 98/101 | 95/100 |
| EA/BA 1:1 10 s | 1/0 | 1/0 | 1/0 | 0 | 1/0 | 0 | 1/0 |
| Acetone 10 s | 2/0 | 1/0 | 2/0 | 1/0 | 2/0 | 2/0 | 1/0 |
| Ammonia 2 min | 0 | 0 | 0 | 0 | 0 | 0 | 0 |
| Soda 2 min | 0 | 0 | 0 | 0 | 0 | 0 | 0 |
| Ethanol 50% 1 h | 0 | 0 | 0 | 0 | 0 | 1/0 | 0 |
| Water 16 h | 0 | 0 | 0 | 0 | 0 | 0 | 0 |
| Red wine 5 h | 0 | 0 | 0 | 0 | 0 | 0 | 0 |
| Mustard 5 h | 0 | 0 | 0 | 0 | 1/0 | 1/0 | 0 |
| Coffee 16 h | 0 | 0 | 0 | 0 | 0 | 0 | 0 |

The hardeners were mixed in for 2 min using an agitator at approx. 2000 rpm. Wet films were then applied to an MDF board coated with a melamine resin film in a coating thickness of 150 μm. The test surfaces were first pre-dried for 15 min at approx. 20° C. then cured for 60 min at 60° C. and stored for a further 7 days at approx. 20° C. The chemical resistance values were tested according to DIN 68861.

Note: If 2 measured values are shown, the first value is an immediate assessment and the second value an assessment after 3 days.

This paint was also applied to a test card in a wet film thickness of 200 μm and the degree of gloss (at an angle of 60° C.) was determined after 24 h (storage at approx. 20° C.).

This series of tests showed that high-gloss paint systems with outstanding chemical resistance values are obtained with the OH-containing dispersions according to the invention.

Example 18

Paints were prepared according to example 9 and applied to film-coated MDF boards by means of an airless plant (2-component plant from Graco). Application tests were performed with the following nozzle combinations:

Application example 1: Spraying nozzle (0.32 mm); no pre-atomising nozzle

Application example 2: Spraying nozzle (0.32 mm); pre-atomising nozzle (0.38 mm)

Application example 3: Spraying nozzle (0.32 mm); pre-atomising nozzle (0.28 mm)

Application example 4: Spraying nozzle (0.32 mm); pre-atomising nozzle (0.23 mm)

The paints were applied in a wet film thickness of approx. 200 g/m$^2$, pre-dried for approx. 30 min at 22° C. and post-cured for approx. 1 h at approx. 60° C. The appearance of these coatings was assessed.

Whilst application examples 1 and 2 led to matt and uneven coatings, application example 4 in particular demonstrated a high-gloss, uniform coating. Application example 3 was slightly inferior to application example 4. These application examples show that the dispersions according to the invention can be applied under practical conditions on a conventional 2-component spraying plant using simple pre-atomising nozzles, which have a smaller aperture than spraying nozzles.

Example 19

In Example 19 a pigment paste with the additives mentioned in the table below was prepared by dispersion using a high-speed stirrer. Subsequent dispersion was carried out for 15 mins at 2000 r.p.m.

Pigment Paste

| | |
|---|---|
| Polymer polyol dispersion 3 | 168.0 |
| Tronox R-KB-2 | 200.0 |
| Aerosil 200 | 1.0 |
| Byk 024 | 2.0 |
| Disperbyk 190 | 4.0 + 4.0 |

Using this pigment paste a lacquer formulation according to the following table was prepared analogously to Examples 1–6.

Lacquer

| | |
|---|---|
| Pigment paste | 38.0 |
| Polymer polyol dispersion 3 | 38.0 |
| Byk 024 | 1.0 |
| Butyl glycol | 8.0 |
| Water | 15.0 |
| Polyisocyanate 3 | 10.0 |

The applicational results are listed in the following table. The properties tested were as follows: the drying properties, the formation of hardness by means of pendulum damping, the gloss and the resistance to chemicals (the latter according to DIN 68861 1B, drying: 15' at RT, 60' at 60° C., 7 days at RT).

| Tests | |
|---|---|
| Drying | 66' |
| Pendulum damping | |
| immediately | 12" |
| after 1 day | 47" |
| after 2 days | 59" |
| after 7 days | 77" |
| Gloss at 60° 6/w cardboard | 86/86 |
| EA/BA 1:1 | 1/0 |
| Acetone | 1/1 |
| Ammonia | 0 |
| Soda | 0 |
| Ethanol | 1/0 |
| Water | 0 |
| Red wine | 0 |
| Mustard | 1/0 |
| Coffee | 0 |

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. An aqueous 2-component polyurethane (PU) coating composition wherein the binder comprises a) a vinyl polymer polyol dispersion, having a hydroxyl number between 10 and 264 mg KOH/g solid resin, an acid value (calculated from the sum of neutralized and non-neutralized acid groups) between 0 and 55 mg KOH/g solid resin, a number-average molecular weight $M_n$ of at least 5000 g/mol and a weight average molecular weight $M_w$ of at least 30,000 g/mol, a glass transition temperature of at least 20° C. and an average particle diameter of no greater than 300 nm, which is prepared in the presence of 0.1 to 10.0 wt. %, relative to the sum of the solids contents of polymer polyol and polyisocyanate, of a non-ionic polyether surfactant selected from the group consisting of block polymers of ethylene oxide and propylene oxide of formula (I)

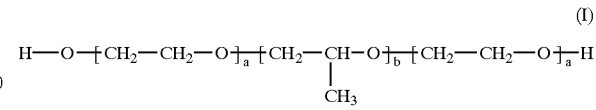

block and random ethylene oxide/propylene oxide copolymers based on fatty alcohols, block polymers of formula (III), which can be obtained by polycondensation of propylene oxide and ethylene oxide on ethylene diamine,

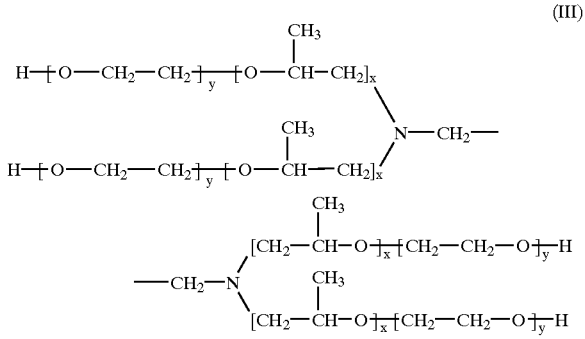

(III)

adducts of polyethylene oxide on fatty alcohols and polyether/polyester block polymers, and b) a polyisocyanate having a viscosity at 23° C. of no more than 12,000 mPa*s and either a non-hydrophilic or a non-ionically or anionically hydrophilic character, wherein the equivalent ratio of isocyanate groups of component b) to hydroxyl groups of component a) is 0.2:1 to 5:1.

2. The coating composition of claim 1, wherein component a) is prepared in the presence of 1.0 to 8.0 wt. % of the non-ionic polyether surfactant.

3. The coating composition of claim 1, wherein the non-ionic polyether surfactant comprises a block polymer of ethylene oxide and propylene oxide of formula (I):

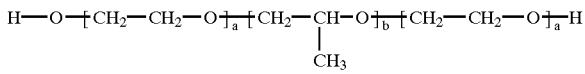

(I)

4. The coating composition of claim 1, wherein the non-ionic polyether surfactant comprises a block and random ethylene oxide/propylene oxide copolymer based on fatty alcohols.

5. The coating composition of claim 1, wherein the non-ionic polyether surfactant comprises a block polymer of propylene oxide and ethylene oxide on ethylene diamine of formula (III):

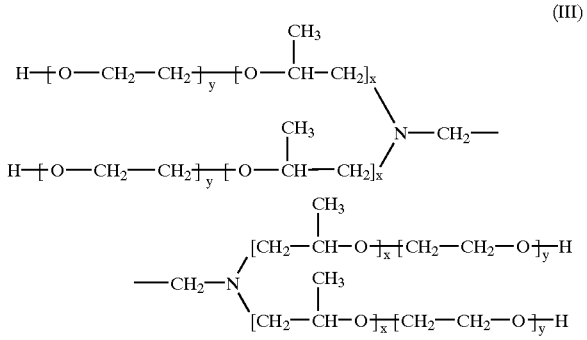

(III)

6. The coating composition of claim 1, wherein the non-ionic polyether surfactant comprises an adduct of polyethylene oxide on a fatty alcohol.

7. The coating composition of claim 1, wherein the non-ionic polyether surfactant comprises a polyether/polyester block copolymer.

8. The coating composition of claim 1, wherein the non-ionic polyether surfactant has an ethylene oxide content of 5 to 80 wt. %, a molecular weight up to 10000 g/mol and a hydroxyl contents of 0.3 wt. % to 8.0 wt. %.

9. A process for producing the coating composition according to claim 1 comprising adding the non-ionic polyether surfactant during production of the polymer polyol dispersion a).

10. A process for producing the coating composition according to claim 1 comprising adding the non-ionic polyether surfactant to a polymerization batch before production of the polymer polyol.

11. The coating composition of claim 1, wherein the polyisocyanate b) is non-hydrophilic, and non-self dispersible in aqueous solution.

12. The coating composition of claim 1, wherein the polyisocyanate b) is hydrophilically modified with a polyether monoalcohol.

13. The coating composition of claim 1, wherein the polyisocyanate b) contains anionic groups.

14. The coating composition of claim 13, wherein the polyisocyanate b) comprises 0.2 to 5.0 wt. %, relative to the sum of solids contents of polymer polyol and polyisocyanate, of at least one phosphate group-containing surfactant selected from the group consisting of

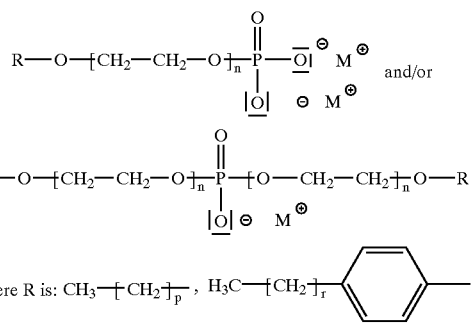

$n = 1\text{–}100;\ p = 5\text{–}20;\ r = 5\text{–}15;\ M = $ alkali-or (substituted) ammonium ion 15. The coating composition of claim 13, wherein the polyisocyanate b) comprises sulfonate groups in chemically incorporated form.

16. A wood, metal, plastic or mineral substrate painted with the coating composition of claim 1.

17. A method of coating a substrate comprising painting thereupon the composition according to claim 1.

18. The method of claim 17, wherein the substrate is selected from the group consisting of wood, metal, plastic or mineral.

* * * * *